Dec. 18, 1934.  H. T. FAUS  1,985,082
ELECTRICAL MEASURING INSTRUMENT
Filed Oct. 5, 1933
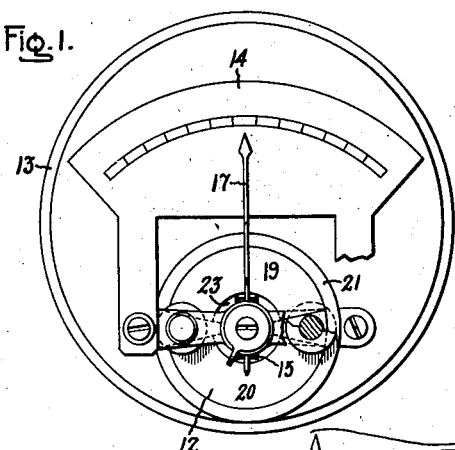
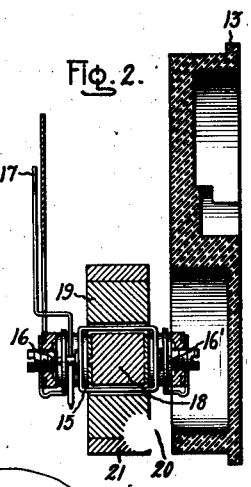
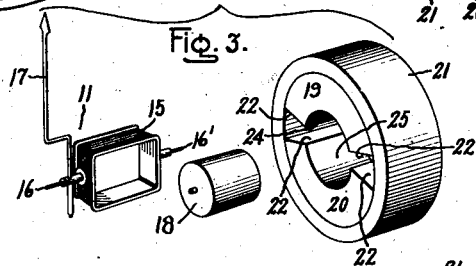
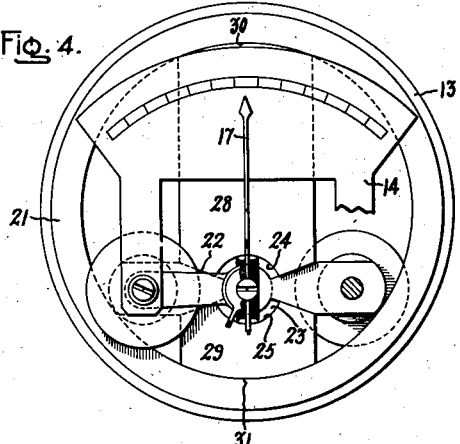
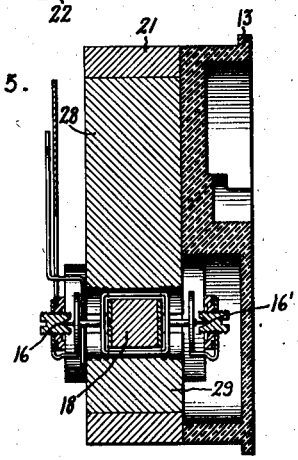
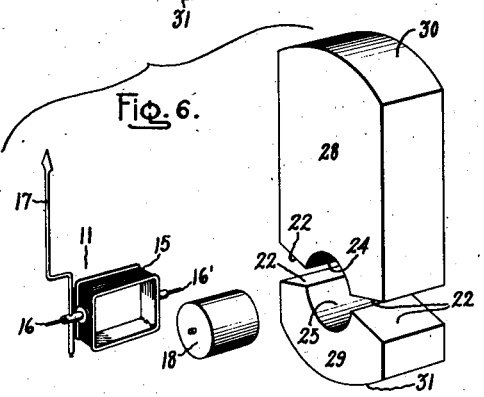
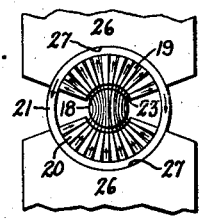
Inventor:
Harold T. Faus,
by Harry E. Dunham
His Attorney Patented Dec. 18, 1934

1,985,082

UNITED STATES PATENT OFFICE 1,985,082

ELECTRICAL MEASURING INSTRUMENT

Harold T. Faus, Lynn, Mass., assignor to General Electric Company, a corporation of New York Application October 5, 1933, Serial No. 692,272

11 Claims. (Cl. 171—95)

My invention relates to electrical instruments and concerns particularly magnetic field arrangements for use with electrical instruments of the D'Arsonval type.

It is an object of my invention to provide magnetic field constructions which will permit readily producing at relatively low cost, compact, sensitive electrical instruments having substantially uniform scale distribution. Other and further objects of my invention will become apparent as the description proceeds.

In carrying out my invention in its preferred form, I employ permanent magnets having concave cylindrical pole faces opposite each other with a core for a moving coil placed between said pole faces to form air gaps for said movable coil, and I utilize an annular magnetic return unit surrounding said permanent magnets and in contact with their oppositely extending pole faces.

The features of my invention, which I believe to be novel and patentable, will be pointed out in the claims appended hereto. A better understanding of my invention, itself, may be obtained by referring to the following description taken in connection with the accompanying drawing in which Fig. 1 represents a plan view of one embodiment of my invention; Fig. 2 is a vertical section of the embodiment illustrated in Fig. 1; and Fig. 3 is an exploded view in perspective of the instrument mechanism of the embodiment shown in Figs. 1 and 2. Fig. 4 illustrates in plan a second embodiment of my invention; Fig. 5 is a vertical section of the embodiment of Fig. 4; Fig. 6 is an exploded view in perspective of the instrument mechanism of the embodiment of Figs. 4 and 5; and Fig. 7 is a schematic diagram illustrating the manner in which the permanent magnets utilized in the instruments constructed in accordance with my invention may be magnetized.

Referring now more in detail to the drawing in which like reference characters refer to like parts throughout, in the arrangement of Fig. 1, the instrument comprises an instrument mechanism consisting of a movable element 11 and a magnetic field unit 12 mounted on a suitable base 13 in a casing, not shown, and provided with a scale 14. The movable element consists of a current conducting coil 15 suitably mounted to permit rotation about an axis 16—16' and a pointer 17 cooperating with the scale 14. The magnetic field comprises a cylindrical core 18, a pair of permanent magnets 19 and 20 having the shape of segments of an annulus and an annular magnetic return 21, all substantially coaxial with the axis of rotation of the element 11. The annular return element 21 serves also as a magnetic shield, protecting the instrument from the effect of terrestrial magnetism or stray fields produced by other electrical or magnetic apparatus.

The lateral surfaces 22 of the permanent magnets 19 and 20 are radial planes passing through the axis 16—16' of the annular segments 19 and 20, and the annulus 21. The permanent magnets 19 and 20 are magnetized in such a manner that the magnetic lines of force and the flux therein pass radially through said magnets, as indicated by the arrows in Fig. 7, making the magnets 19 and 20 the equivalent of a large number of bar magnets of equal length. Consequently, the pole strength of the magnets is substantially uniform across their pole faces 24 and 25. Likewise the flux density in the air gap 23 of the instrument is substantially uniform throughout the air gap, resulting in a uniform scale distribution. The use of permanent magnets in the shape of segments of an annulus permits a compact instrument construction, and also permits obtaining a relatively uniform flux in the air gap notwithstanding the fact that the length of the pole faces is relatively great in comparison with the lengths of the magnets. In the embodiments, where this relationship between the length of pole face and the length of magnet exists, it is desirable that the lateral surfaces 22 should be substantially radial in order that the length of the magnets in the direction of magnetization will be substantially equal throughout and the same magnetic strength will be obtained across the pole face.

The magnets 19 and 20 are preferably composed of magnetic material having a relatively high coercive force such as, for example, cobalt steel or an aluminum-nickel alloy of iron composed of approximately 6 to 15% aluminum and approximately 20 to 30% nickel. A convenient way of magnetizing the permanent magnets is to assemble the instrument mechanism completely and to place it between poles 26 of any suitable magnetizing arrangement, preferably an electromagnet. The poles 26 have concave cylindrical pole faces 27 fitting the outer surface of the annulus 21 and, since the poles 26 and the annulus 21 are composed of relatively high permeability magnetic material, the magnet lines of force tend to pass along normals to the pole faces 27 or radially through the permanent magnets 19 and 20, as indicated by the arrows. Such a high magneto-motive force is used in magnetizing the instrument that the annulus 21 becomes saturated and a magnetizing flux is forced across the airgaps 23 and through the permanent magnets 19 and 20 in a radial direction.

When instruments of specially high sensitivity are required, it may be desirable to increase the length of the permanent magnets as shown in the embodiment of Fig. 4. In this embodiment, the annular magnetic return element 21 is increased to substantially the diameter of the casing of the instrument and bar magnets 28 and 29 are employed. The magnets 28 and 29 are preferably of unequal lengths in order to permit placing the axis of the movable element near one side of the face of the instrument and utilizing a pointer of the greatest possible length. As in the arrangement of Fig. 1, the permanent magnets 28 and 29 have outer convex cylindrical pole faces 30 and 31 in contact with the inner surface of the annulus 21, and have inner concave cylindrical pole faces 24 and 25 spaced from the cylindrical core 18 to form the air gaps 23. The inner ends of the magnets 28 and 29 also have their lateral surfaces 22 along substantially radial planes in order that the magnetic lines of force in the portion of the magnets near the air gaps will be substantially normal to the pole faces, the pole strength will be substantially uniform along the pole faces, and a substantially uniform flux strength will be produced in the air gap. It will be understood that, in magnets of greater length relative to the length of pole faces as shown in the embodiment of Fig. 4, less difficulty is experienced in obtaining uniform flux strength in the air gap. For this reason, it is not absolutely essential to extend the radial surface 22 to the inner surface of the annulus 21 as shown in the arrangement of Fig. 1, although, if desired, such a construction may also be employed in connection with the embodiment of Fig. 4.

Although I have described and illustrated the method of carrying out my invention in connection with indicating electrical instruments, it will be understood that my invention is not limited thereto but, obviously, includes applications in recording instruments, contact making instruments, etc.

In accordance with the provisions of the patent statutes, I have described the principle of operation of my invention together with the apparatus which I now consider to represent the best embodiments thereof, and I desire it to be understood that the apparatus shown and described is only illustrative and that the invention may be carried out by other arrangements.

What I claim as new and desire to secure by Letters Patent of the United States is:

1. An electrical instrument comprising in combination a rotatable current conducting coil, a cylindrical magnetic core substantially coaxial with the axis of rotation of said coil, a pair of radially magnetized permanent magnets of relatively high coercive force having the form of segments of an annulus also substantially coaxial with the axis of rotation of said coil, a pair of air gaps for said coil being formed between the said cylindrical core and the inner circular surfaces of said permanent magnets forming their pole faces, and a low coercive force magnetic member joining the outer circular surfaces of said permanent magnets and serving to complete the magnetic circuit of said magnets.

2. In an electrical instrument, a magnetic field arrangement therefor comprising a ring of high permeability magnetic material, and a pair of permanent magnets of high coercive force material having the shape of segments of an annulus with their outer surfaces in contact with the inner surface of said magnetic ring, said magnets being magnetized in a radial direction and being located opposite each other.

3. A magnetic field member for electrical instruments comprising a magnetic core bounded by a surface of revolution, a pair of permanent magnets of high coercive force material having inner pole faces lying along a surface of revolution substantially coaxial with said core and having outer pole faces, an air gap being formed between said core and said inner pole faces of said permanent magnets, said permanent magnets being magnetized in directions substantially along normals to their inner pole faces, and a magnetic return element in contact with the outer pole faces of said permanent magnets.

4. A magnetic field member for an electrical instrument comprising a magnetic return element, a pair of permanent magnets of high coercive force material having outer pole faces in contact with said magnetic return element and having inner pole faces opposite each other, and a cylindrical core located between said inner pole faces and spaced therefrom to form a pair of air gaps, the inner ends of said permanent magnets being bounded by cylindrical surfaces substantially coaxial with the axis of said core to form said inner pole faces and planes at the edges of said inner pole faces substantially coinciding with planes including the axis of said core for the purpose of permitting the portions of said permanent magnets near their inner pole faces to be magnetized along normals to their inner pole faces.

5. A magnetic field member for electrical instruments comprising a pair of permanent magnets having inner pole faces opposite each other and outer pole faces, a magnetic core between said inner pole faces and a magnetic return element joining said outer pole faces, said permanent magnets being relatively short in the direction of magnetization in comparison with the lengths of their pole faces, and being magnetized along normals to their inner pole faces.

6. In a magnetic field structure for an electrical instrument, a permanent magnet having the shape of a segment of an annulus and magnetized along radii of the circles forming said annulus.

7. In a magnetic field structure for an electrical instrument, a permanent magnet having lateral surfaces generated by radial lines intersecting a common axis, and having at least one pole face lying along a surface of revolution coaxial with said axis, said magnet being magnetized in directions lying along normals to said pole face.

8. In a magnetic field structure for an electrical instrument, a permanent magnet having pole faces lying along concentric surfaces of revolution and being magnetized along normals to the inner pole face.

9. In a magnetic field structure for an electrical instrument, a permanent magnet having pole faces lying along a surface of revolution and being magnetized along normals to said pole faces, the length of said magnet in the direction of magnetization being relatively short in comparison with the length of said pole faces.

10. A magnetic field unit for an electrical instrument comprising in combination a substantially cylindrical magnetic core, a pair of permanent magnets having the shape of segments of an annulus, and an annular magnetic return element, the circular surfaces of said permanent magnets forming their pole faces, the outer pole faces being in contact with the inner circular surface of said annular magnetic return element and the inner pole faces being spaced from said cylindrical core to form air gaps, said permanent magnets being radially magnetized.

11. A magnetic field unit for an electrical instrument comprising an annular magnetic return unit, a pair of permanent magnets of unequal lengths placed with their magnetic axes in line, having concave cylindrical pole faces facing toward each other and convex cylindrical pole faces facing away from each other and a substantially cylindrical core placed between the said concave cylindrical pole faces and spaced therefrom to form a pair of air gaps, said convex cylindrical pole faces and the inner surface of said annular magnetic return element having equal radii and said convex pole faces being in contact with the inner surface of said annular return element.

HAROLD T. FAUS.